Figure 1:
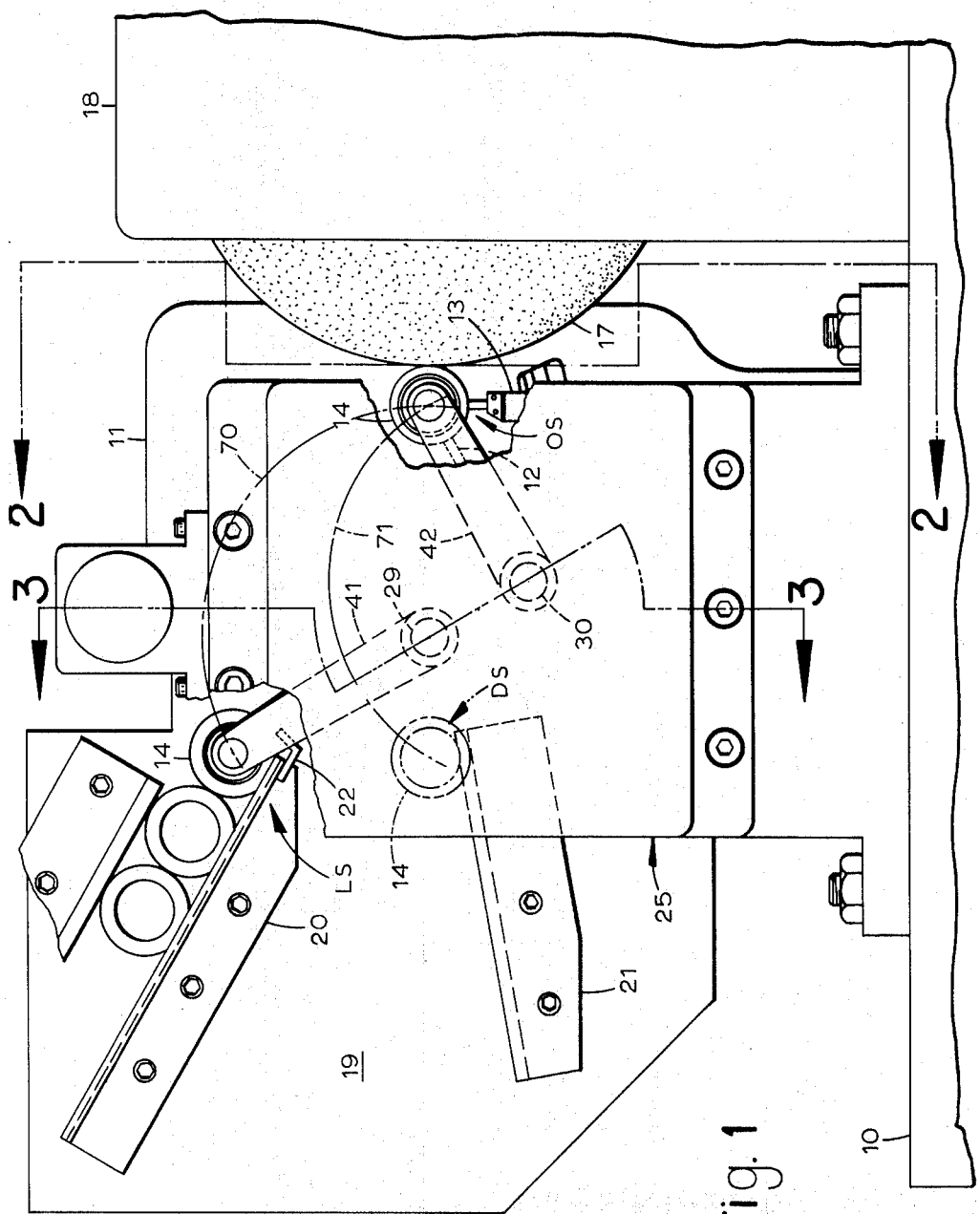

Jan. 4, 1966　　　W. B. SEIDEL　　　3,226,886
MACHINE TOOL LOADING MECHANISM
Filed Jan. 10, 1964　　　3 Sheets-Sheet 1

INVENTOR.
WILLIAM B. SEIDEL
BY
Howard S Keiser
John F. Verhoeven
ATTORNEYS

Jan. 4, 1966  W. B. SEIDEL  3,226,886

MACHINE TOOL LOADING MECHANISM

Filed Jan. 10, 1964  3 Sheets-Sheet 2

United States Patent Office 3,226,886
Patented Jan. 4, 1966

3,226,886
MACHINE TOOL LOADING MECHANISM
William B. Seidel, Cincinnati, Ohio, assignor to The Cincinnati Milling Machine Co., Cincinnati, Ohio, a corporation of Ohio
Filed Jan. 10, 1964, Ser. No. 337,070
8 Claims. (Cl. 51—215)

The present invention relates to a mechanism for loading articles in a machine tool, particularly suitable for simultaneously loading and unloading workpieces in a centerless grinding machine.

The speed of a loading device for a machine tool, such as a workpiece loader for a grinding machine, increases in importance as the number of workpieces to be successively operated on increases, since the time spent in loading the machine is not available for an operation on a workpiece. Frequently, a loader for loading articles like workpieces or tools is required which will effect, in rapid succession, a movement in translation and a rotary, or swinging, movement (see, for example, U.S. Patent 2,912,798 issued November 17, 1959). In the present invention, a loading mechanism of this type is provided which is simpler and less expensive than mechanism used heretofore for producing these sequential motions.

In brief, in the preferred form of the invention, which operates simultaneously to load a workpiece in and unload a workpiece from an operating station of the machine tool, a first piston is received in a housing and carries two axially fixed shafts therein. The first piston has a bore (through which the shafts extend) having a second piston received therein, and the second piston has ball nuts engaged with the shafts. Each shaft extends outside the housing and has an arm thereon to engage a workpiece. A valve directs pressure under fluid to one end of the first piston to advance the arms simultaneously, in translation, into engagement with workpieces, respectively, at a loading station and an operating station. As the first piston completes its advance, fluid under pressure is automatically directed to one end of the second piston to simultaneously rotate the shafts for swinging movement of one workpiece from the loading station to the operating station and simultaneous swinging movement of a finished workpiece from the operating station to an unloading station. Thereafter, pressure is applied to the opposite end of the first piston, and then the opposite end of the second piston, to sequentially retract the arms from the workpieces and reversely swing the arms, empty, back to their starting positions.

It is, therefore, one object of the present invention to provide improved mechanism for loading a machine tool. It is yet another object of the present invention to provide simple, inexpensive, mechanism for simultaneously loading a workpiece into and unloading a workpiece from an operating station in a machine tool.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a side fragmentary view of a centerless grinding machine; and

Figure 2:
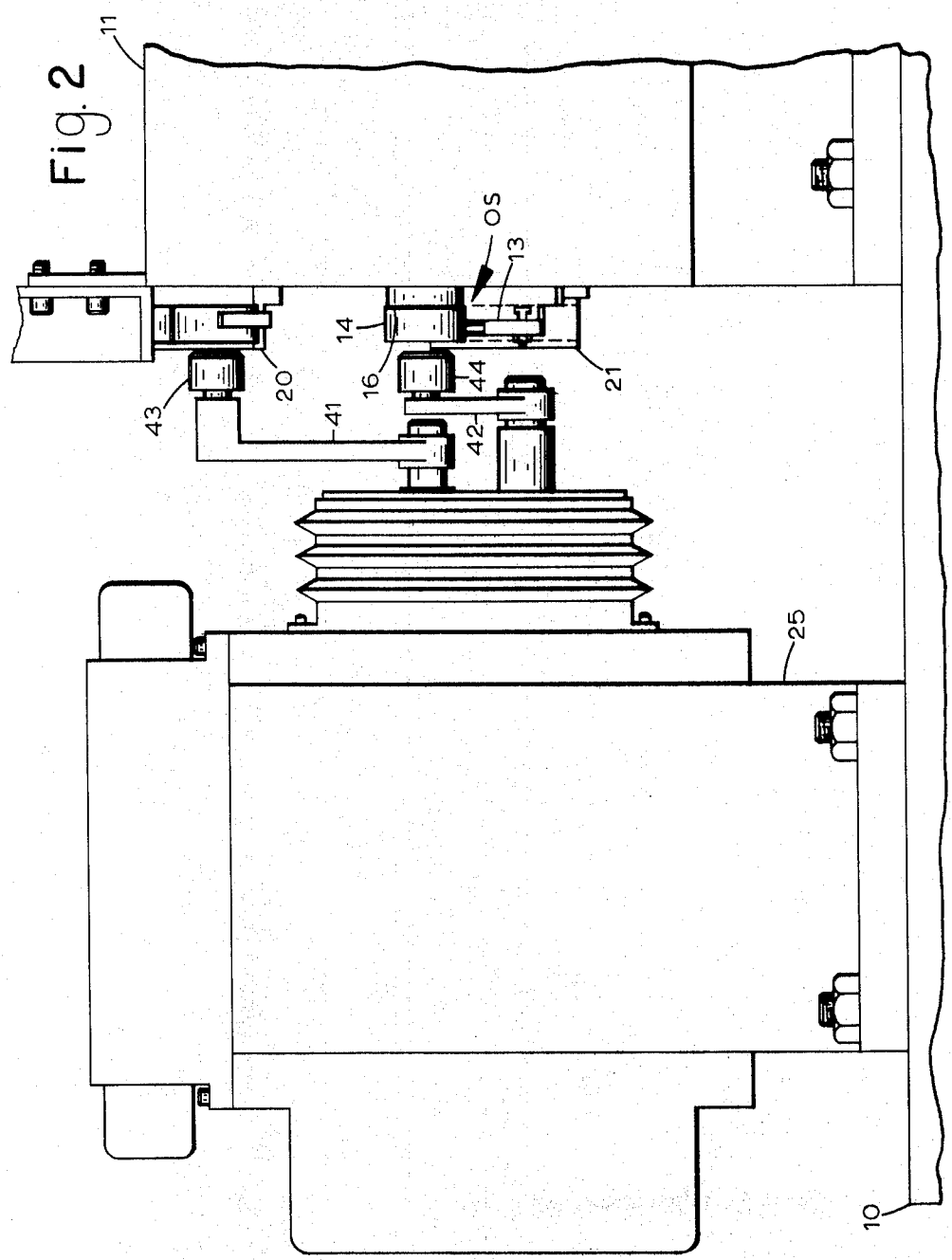
Figure 3:
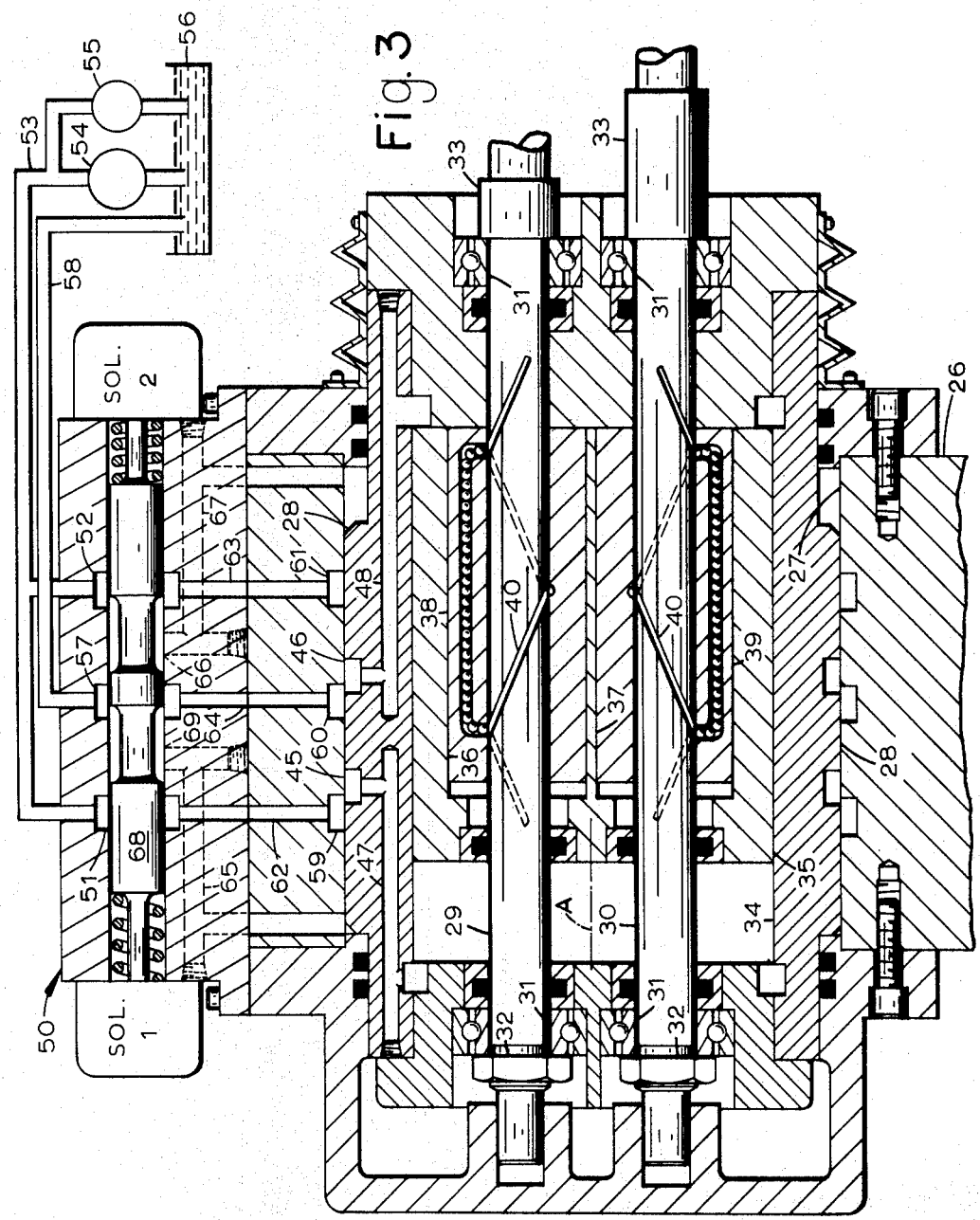

FIGS. 2 and 3 are views taken on the lines 2—2 and 3—3, respectively, of FIG. 1.

There is shown in FIGS. 1 and 2 the base 10 of a grinding machine having a headstock 11 mounted thereon. The headstock has a pair of angularly spaced workpiece supporting shoes 12 and 13 mounted on the front face thereof which define an operating station OS in the machine where an annular workpiece 14 is supported for a grinding operation thereon. The headstock 11 has a spindle terminating in a driving face 16 which engages one end of a workpiece received in the shoes to rotate the workpiece for grinding. A rotating grinding wheel 17 is carried in a wheelhead 18 which advances for a grinding operation on the workpiece in the shoes, and which retracts for removal of the finished workpiece from the shoes and insertion of an unoperated workpiece in the shoes.

A plate 19, connected to the headstock and flush with the front face thereof, supports a first inclined chute 20 and a second inclined chute 21. The first inclined chute 20, which has a stop 22 at its lower, inner end, holds unoperated workpieces and defines a loading station LS for the grinding machine. The second inclined chute 21 receives finished workpieces at its higher, inner end and defines a discharge station DS for the grinding machine. The chutes 20, 21 and the shoes 12, 13 all lie in a common plane so that the loading station, operating station, and discharge station are coplanar.

A loader, shown generally at 25, is mounted on base 10 intermediate the loading station, the operating station, and the discharge station and adjacent the plane of these stations. The loader 25 has a housing 26 which defines a first internal cylinder chamber 27 having a central longitudinal axis A normal to the plane of the machine tool stations. A first cylindrical piston 28 is received in cylinder chamber 27 and defines a carrier for two parallel spaced apart shafts 29, 30 which are rotatably mounted in bearings 31 secured in the piston 28 and which extend parallel to axis A. Each shaft has a nut 32 and collar 33 straddling the bearings to prevent axial movement of the shafts relative to the carrier piston 28.

The carrier piston 28 defines a second internal cylinder chamber 34 (through which shafts 29 and 30 extend) which is coaxial with cylinder chamber 27 and receives a second piston 35. The piston 35 has two internal bores 36 and 37, in registration with shafts 29 and 30, which have secured therein two ball nuts 38 and 39, respectively. The ball nuts 38 and 39 are of opposite hand, and each shaft has a corresponding helical groove 40 to define a helical screw engaged with one of the nuts. Thus the second piston defines an actuator which, when moved axially with respect to the shafts, rotates the shafts simultaneously. Each shaft 29, 30 extends forwardly through the housing and each carries a workpiece transporting arm 41, 42, respectively, outside the housing. The two arms 41, 42 are axially spaced apart on the two shafts, and lie in spaced apart planes normal to the shafts, so that when the shafts rotate, the arms swing in different planes. Arm 41 has a finger 43, parallel to shaft 29, at its outer end and arm 42 has a finger 44, parallel to shaft 30, at its outer end.

The first piston 28 has two external annular grooves 45 and 46 which are in continuous communication, respectively, with the rear end of the internal cylinder chamber 34 therein (through passage 47) and with the front end of the chamber 34 (through passage 48). A solenoid operated spring centered valve 50 is mounted on housing 26. Valve 50 has two annular pressure grooves 51 and 52 connected to a pressure line 53 which is supplied by a pump 54. Relief valve 55 is connected to pressure line 53 to return fluid to sump 56 when the pressure in line 53 exceeds a desired maximum value. Valve 50 also has an annular discharge groove 57 connected to a return line 58 through which fluid is returned to sump 56.

The first cylindrical chamber 27 has three annular internal grooves 59, 60 and 61. The grooves 59 and 61, which are connected, respectively, by passages 62 and 63, to annular grooves 51 and 52, are continuously connected to pressure line 53. The groove 60, which is connected by passage 64 to groove 57 is continuously connected to return line 58. The grooves 59, 60, and 61 define ports which are axially positioned and spaced in the housing so that the external grooves 45 and 46 which define ports on the carrier piston 28 are in communication with grooves 59 and 60, respectively, when the piston 28 is in its extreme rearward position in the housing (as shown in FIG. 3), and so that grooves 45 and 46 are in communication with grooves 60 and 61, respectively, when the piston 28 is in its extreme forward position in the housing.

Valve 50 has a port 69 (between grooves 51 and 57) which is continuously connected by passage 65 to the rear end of cylinder chamber 27, and has a port 66 (between grooves 57 and 52) which is continuously connected by passage 67 to the forward end of cylinder chamber 27.

For an understanding of the operation of the mechanism of the present invention, assume that arm 41, which is the loading arm, is angularly positioned as shown in FIG. 1 at the loading station and that arm 42, which is the unloading arm, is angularly positioned as shown in FIG. 1 at the operating station. Assume also that the shaft carrier piston 28 is retracted in the housing, as shown in FIG. 3, so that the fingers 43 and 44 are retracted from workpieces 14 at the loading station and the operating station, respectively. Thus groove 46 of the piston carrier is in communication with groove 60 so that the forward end of chamber 34 is connected to return line 58. Groove 45 is in communication with groove 59 so that the rear end of chamber 34 is connected to pressure line 53, thereby holding the second piston 35 in its extreme forward position in chamber 34, as shown in FIG. 3. At this time solenoid SOL1 is energized and solenoid SOL2 is deenergized, holding valve plunger 68 of valve 50 to the right as shown in FIG. 3. Thus, port 69, and hence the rear end of chamber 27, is connected to return line 58 and the port 66, and hence the forward end chamber 27, is connected to pressure line 53.

When solenoid SOL2 is energized, and solenoid SOL1 deenergized, valve plunger 68 of valve 50 is shifted to the left of the position shown to connect port 64, and hence the rear end of chamber 27, to pressure line 53 (through groove 51), and to connect port 66, and hence the forward end of chamber 27, to return line 58 (through groove 57). This advances the carrier piston 28 in chamber 27, and advances the arms 41 and 42 in translation for insertion of the fingers 43 and 44 into the workpieces 14. As the piston carrier 28 advances, grooves 45 and 46 thereon become disconnected from grooves 59 and 60 in the housing, and become connected, as the piston 28 approaches the forward end of cylinder 27, with grooves 60, 61, respectively. This reverses the pressure differential on the actuator 35 and drives the actuator rearwardly in chamber 34. The rearward axial movement of ball nuts 38, 39 with respect to shafts 29, 30 causes rotation of these shafts in opposite directions. The shaft 29 rotates clockwise (as viewed in FIG. 1) to swing arm 41 (and a workpiece thereon) in a circular arc, indicated at 70, from the loading station LS to the operating station OS. The shaft 30 simultaneously rotates counterclockwise to swing arm 42 (and a workpiece thereon) in a circular arc, indicated at 71, from the operating station to the discharge station.

When solenoid SOL1 is again energized, and solenoid SOL2 deenergized, valve plunger 68 is again shifted to the right to retract carrier piston 28 in the housing, retracting the fingers from the workpieces. As the carrier piston approaches its extreme rearward limit of movement, and grooves 45 and 46 again move into communication with grooves 59 and 60, the pressure differential on actuator 35 is reversed to move the actuator to its forward position in chamber 34. This movement causes arm 41, which is now empty, to swing counterclockwise back to the loading station and causes arm 42, which is also empty, simultaneously to swing clockwise back to the operating station.

What is claimed is:
1. An article loading mechanism for a machine tool comprising:
 (a) a housing,
 (b) a carrier mounted in the housing for linear movement relative thereto,
 (c) a shaft rotatably mounted in the carrier and axially fixed relative thereto, said shaft having a helical groove and having means to engage an article to be loaded,
 (d) an actuator mounted in the carrier for linear movement relative thereto, said actuator engaged with the helical groove on the shaft,
 (e) means to shift the carrier in the housing for translational movement of the shaft,
 (f) and means to shift the actuator in the carrier for rotary movement of the shaft.

2. An article loading mechanism for a machine tool comprising:
 (a) a housing,
 (b) a first piston mounted in the housing for linear movement therein,
 (c) a shaft rotatably mounted in the first piston and axially fixed therein, said shaft having a helical ball groove and having means to carry an article spaced from said shaft,
 (d) a second piston mounted in the first piston for linear movement therein,
 (e) a ball nut secured in the second piston around said shaft and having balls received in the helical groove of the shaft,
 (f) means to shift the first piston in the housing to effect axial movement of the shaft,
 (g) and means to shift the second piston in the first piston to effect rotation of the shaft for swinging the article from one position in the machine to another position therein.

3. A loader for a machine tool comprising,
 (a) a housing,
 (b) a carrier mounted in the housing and having two parallel shafts axially fixed therein, said shafts each having a helical groove therein and each extending from the housing,
 (c) means to reciprocate the carrier in the housing to advance and retract the shafts axially,
 (d) an actuator mounted in the carrier and engaged with the helical grooves on the shaft,
 (e) means to reciprocate the actuator in the carrier to oscillate said shafts,
 (f) and an article transporting arm on each of said shafts, said arms spaced apart axially on said shafts to swing articles in spaced apart planes normal to the axes of the shafts.

4. A loader for a machine tool comprising:
 (a) a housing,
 (b) a first piston mounted in the housing for linear movement therein,
 (c) a pair of parallel shafts rotatably mounted in the first piston and axially fixed therein, each of said shafts having a helical ball groove thereon,
 (d) a second piston mounted in the first piston for linear movement therein, said second piston having parallel bores extending therethrough to receive said shafts,
 (e) two ball nuts secured, respectively, in said bores and having balls received in said grooves of the shafts,
 (f) a workpiece transporting arm received on each of said shafts,
 (g) means to shift the first piston in the housing to effect translational movement of the arms in unison,
 (h) and means to shift the second piston in the first piston to effect rotational movement of the arms in unison.

5. A loader for a machine tool comprising:
(a) a housing defining a first cylinder,
(b) a first piston mounted in said first cylinder for linear movement therein, said first piston defining a second cylinder therein,
(c) a pair of parallel shafts rotatably mounted in the first piston and axially fixed therein, said shafts extending through said second cylinder, each of said shafts having a helical ball groove thereon and said ball grooves of opposite hand,
(d) a second piston mounted in the second cylinder for linear movement therein, said second piston having parallel bores extending therethrough to receive said shafts,
(e) two ball nuts of opposite hand secured, respectively, in said bores and having balls received in said grooves of the shafts,
(f) a workpiece transporting arm received on each of said shafts,
(g) means to direct fluid pressure alternately to one end and the other end of said first cylinder to effect translational movement of the arms in unison,
(h) and means to direct fluid pressure alternately to one end and the other end of said second cylinder to effect rotational movement of the arms in opposite directions in unison.

6. A loader for a machine tool having a source of fluid under pressure comprising:
(a) a housing defining a first cylinder having internal ports,
(b) a first piston mounted in said first cylinder for linear movement therein, said first piston having a second cylinder therein and having two external ports connected, respectively, to the ends of said second cylinder, said external ports in communication with internal ports in the first cylinder in the extreme positions of said first piston to establish a pressure differential at the ends of the second cylinder,
(c) a pair of parallel shafts rotatably mounted in the first piston and axially fixed therein, said shafts extending through said second cylinder, each of said shafts having a helical ball groove thereon and said ball grooves of opposite hand,
(d) a second piston mounted in the second cylinder for linear movement therein in response to a pressure differential at the ends of the second cylinder, said second piston having parallel bores extending therethrough to receive said shafts,
(e) two ball nuts of opposite hand secured, respectively, in said bores and having balls received in said grooves of the shafts,
(f) a workpiece transporting arm received on each of said shafts,
(g) a valve operable to direct fluid under pressure from said source alternately to one end and the other end of said first cylinder to effect movement of the first piston for advance and retraction of the arms, said movement of the first piston relocating the external ports thereon relative to the ports in the first cylinder to reverse the pressure differential across the ends of the second cylinder.

7. In a machine tool for grinding annular workpieces, said machine tool having a loading station, an operating station, and a discharge station lying in a common plane, the improvement comprising,
(a) a housing mounted on the machine tool adjacent said common plane,
(b) a carrier mounted in the housing and having two parallel shafts axially fixed therein, said shafts each having a helical ball groove thereon and each shaft extending from the housing,
(c) a workpiece carrying arm mounted on each shaft outside the housing, said arms axially spaced apart on said respective shafts and each having a finger at the outer end extending parallel to the shafts.
(d) an actuator mounted in said carrier, said actuator comprising two ball nuts received on said shafts,
(e) means to shift said carrier in the housing for advance of said fingers into workpieces and retraction of said fingers from said workpieces,
(f) and means to shift said actuator in the carrier to simultaneously swing said arms for transportation of workpiece from the loading station to the operating station and simultaneous transportation of another workpiece from the operating station to the discharge station.

8. In a machine tool for grinding annular workpieces, said machine tool having a loading station, an operating station, and a discharge station lying in a common plane, said machine having a fluid pressure line and a fluid return line, the improvement comprising,
(a) a housing mounted on the machine tool adjacent said common plane and intermediate said stations, said housing having two internal ports connected, respectively, to the fluid pressure line and the fluid return line,
(b) a carrier mounted in the housing and having two parallel shafts normal to said common plane axially fixed therein, said shafts each having a helical ball groove thereon and each shaft extending from the housing, said carrier movable in the housing in a direction parallel to said shafts and having external ports in communication with the internal ports of the housing when the carrier is in the extreme positions in the housing,
(c) a workpiece carrying arm mounted on each shaft outside the housing, said arms axially spaced apart on said respective shafts and each having a finger at the outer end extending parallel to the shafts,
(d) an actuator mounted in said carrier, said actuator comprising two ball nuts of opposite hand received on said shafts,
(e) a valve operable to direct fluid under pressure alternately to one end and the other end of the carrier for reversible movement of the carrier to advance said fingers into workpieces and retract said fingers from workpieces, the external ports of said carrier communicating with the internal ports of said housing for the application of pressure alternately to one end of the actuator and the other end thereof as said carrier moves from one extreme position in the housing to the other extreme position therein, the movement of said actuator swinging said arms simultaneously in opposite directions for transportation of one workpiece from the loading station to the operating station and simultaneous transportation of another workpiece from the operating station to the discharge station.

References Cited by the Examiner

UNITED STATES PATENTS 2,912,798  11/1959  Seidel et al. _____ 51—103

ROBERT C. RIORDON, *Primary Examiner.*

LEONARD S. SELMAN, *Assistant Examiner.*